July 19, 1960     T. F. THOMPSON     2,945,411

DRAW BAR PIN HAVING A SPRING OPERATED ABUTMENT ELEMENT

Filed July 2, 1957

INVENTOR.

BY THEODORE F. THOMPSON

ATTORNEY

United States Patent Office 2,945,411
Patented July 19, 1960

2,945,411

DRAW BAR PIN HAVING A SPRING OPERATED ABUTMENT ELEMENT

Theodore F. Thompson, Des Moines, Iowa, assignor of one-half to Harry H. Hartupee, Des Moines, Iowa Filed July 2, 1957, Ser. No. 669,652

1 Claim. (Cl. 85—7)

This invention relates generally to connecting units and more particularly to a connecting unit for releasably pivotally connecting separate structures.

An object of this invention is to provide an improved connecting unit for releasably pivotally connecting separate structures.

A further object of this invention is to provide a connecting unit which is of a unitary or self contained structure to thereby dispense with the need for any separate cotter keys, nuts or the like.

Another object of this invention is to provide a connecting unit which is easily and quickly installed to pivotally connect separate structures, and which is readily removable to separate such structures when desired.

A further object of this invention is to provide a connecting unit which is adapted to pivotally inter-connect farm tractor draw bar devices with adjoining supporting arms, and the like.

Still another object of this invention is to provide a connecting unit having a cylindrical body member with an extended bearing shoulder provided near one end and with a transversely movable pin member biased in one direction of movement so as to normally project outwardly from one side of said body member spaced longitudinally from the bearing shoulder, whereby to confine therebetween a rotatable journal member, the pin member being of a construction and relatively assembled with the body member to provide a positive abutment against any force supplied thereon in a direction longitudinally of the body member.

A further object of this invention is to provide a connecting unit which is of a compact and rugged construction, economical in manufacture, and efficient in operation to positively and easily connect and disconnect a pair of members.

Further objects, features and advantages of this invention will become apparent from the following description when taken in connection with the accompanying drawing in which.

Figure 1:
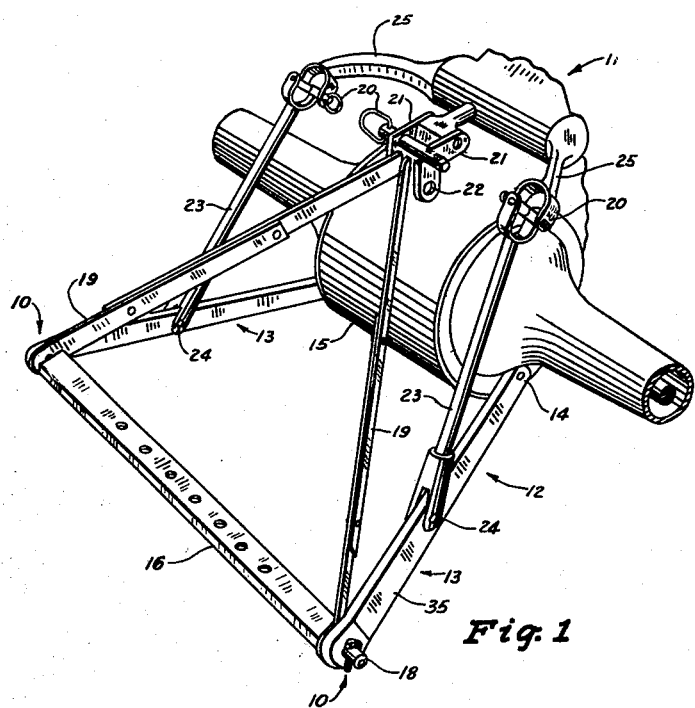
Fig. 1 is a fragmentary perspective view of the rear axle portion of a farm tractor showing a specific application of the invention.
Figure 3:
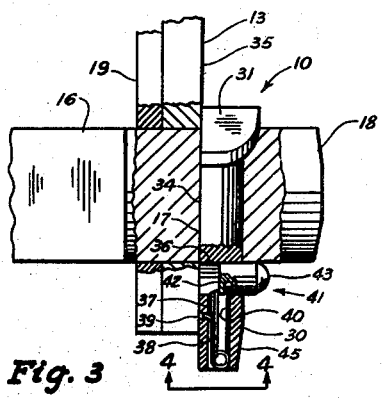
Fig. 3 is a side elevational view of the connecting unit, showing some of the parts in sections and some broken away.

With particular reference to Fig. 1, two connecting units of this invention, indicated generally at 10, are shown in Fig. 1 in assembly relation with the hydraulic power lift apparatus 11 of a farm tractor, only the rear axle assembly 12 of which is shown. The power lift 11 comprises a pair of rearwardly extended diverging arms 13 having their front ends pivoted at 14 to opposite sides of a differential housing 15 formed as part of the rear axle assembly 12. Connected between the rear ends of the arms 13, so as to be raised and lowered by the power lift 11, through a pair of lift arms 23, is a draw bar 16 which is held in place at each end by a connecting unit 10, each unit 10 passing through a bore 17 (Fig. 3) in a journal end 18 of the draw bar 16.

Pivotally supported at their rear ends on the draw bar 16 are a pair of upwardly and forwardly inclined brace bars 19, the forward or upper ends of which are pivotally connected by an engaging key 20 to a pair of transversely spaced bell crank members 21 pivoted in turn, as at 22, to the top side of the differential housing 16. The lift arms 23 have their rear ends pivotally connected at 24 to a corresponding one of the arm members 13, while the forward end of each lift arm 23 is operatively connected by a key 20 with a corresponding crank arm 25 rotatably supported in a portion 26 of the differential housing 15. The crank arms 25 are operatively associated with a power mechanism (not shown) capable of raising and lowering the crank arms 25 to in turn provide for the raising and lowering of the lift arms 23.

A connecting unit 10 includes a cylindrical body member 30 having an enlarged shoulder portion 31 extending laterally from the body member at one end thereof with a lower surface 32 of the portion 31 formed in an arcuate manner so as to provide a bearing surface with the extended bearing journal 18 of the draw bar 16. The body member 30 and shoulder portion 31 have a continuous flat side 34 formed along the length thereof which, when the connecting unit 10 is in place, contacts the outer surface or side 35 of the adjacent arm 13.

A bore 36 is formed transversely in the body member 30 a spaced distance longitudinally from the shoulder portion 31. A passage 37 extended longitudinally of the body member 30 has the inner end thereof registering with the bore 36.

A two-legged torsion spring element 33 is placed in the passage 37 whereby the short leg of the element has a terminal bent portion secured in a notch 39 formed in the body member 30 adjacent the flat side 34 thereof and the longer leg 40 of the spring element extends into the bore 36, the coil portion of the spring being placed in the outer end of the passage 37. Due to the particular placement of the spring element 33, the longer leg 40 thereof tends to move away from the short leg 38, but is held in place by the wall of the longitudinal passage 37 opposite the wall against which the short leg is held; this then being the normal position of the leg 40. An abutment pin 41 having one flat end 42 and a rounded or snubbed end 43 is inserted in the bore 36 for longitudinal movement therein with the flat end 42 adjacent the flat side 34 of the body member 30. The longer leg 40 of the spring element 33 is secured to the pin 41 by insertion into a notch 44 provided in the pin 41.

The arrangement is such that the longer leg 40 of the spring element may move in a direction transverse to the length of the body member 30 or axially of the bore 36, whereby to hold the abutment pin 41 in a normal position wherein the snubbed end 43 of the pin extends beyond the body member, but yet allowing the pin to be yieldably retracted into the bore. As the length of the abutment pin 41 is less than or at least equal to the diameter of the body member 30 or the length of the bore 36, the pin may be confined entirely within the bore 36 without protruding from either end.

To place the connecting unit 10 into use, assume that the rear ends of a brace bar 19 and a corresponding diverging arm 13 have been inserted over the journal end 18 of the draw bar 16 in a manner to expose the bore 17 in the end of the journal 18. The connecting unit 10 is then taken into one hand and the end 45 of the body member 30, the diameter of which has been slightly reduced to aid the insertion, is inserted into the journal end bore 17. Then, after manually depressing the abutment pin 41 completely within the bore 36, a length of the body member 30 is passed through the journal end bore 17 until the lower surface 32 of the shoulder portion 31 contacts the outer surface of the journal 18. The unit 10 is inserted so that the flat side 34 of the unit contacts the outer side 35 of the arm 13. When the abutment pin 41 has cleared the lower side of the journal 18, the pin will automatically spring into its normal position, wherein the snubbed end 43 extends beyond the body member 30, due to the action of the longer leg 40 of the spring element 33 assuming its normal position.

It may be readily appreciated, that by the abutment pin 41 having an outer diameter slightly less than the inner diameter of the bore 36, only a force which is directly longitudinally of the axes of the abutment pin 41 and the bore 36 will cause the pin to be pushed back into the confines of the bore 36. By this arrangement, the rear ends of the brace bar 19 and the diverging arm 13 are held in place about the journal end 18 of the draw bar 16 by the confining action of the connecting unit 10, which positive locking action may be released only by manual actuation or depressing of the pin 41.

Thus to remove the connecting unit 10 from a connecting relation with the rear ends of a brace bar 19 and a diverging arm 13 the abutment pin 41 must be manually forced inwardly into the bore 36 of the body member 30 until the snubbed end 43 does not protrude beyond the body member 30, whereby the body member 30 of the unit 10 may then be manually withdrawn from the bore 17 of the journal end 18.

Figure 2:
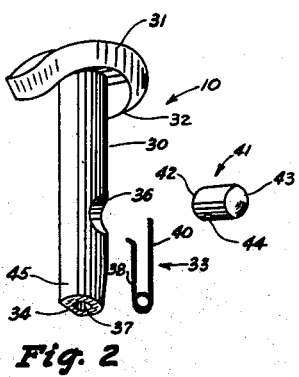
Fig. 2 is an exploded perspective view of the connecting unit with which this invention is concerned.
Figure 4:
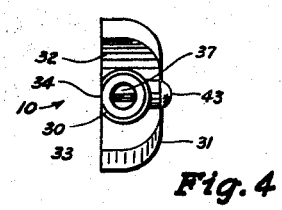
Fig. 4 is a view taken along the lines 4—4 indicated in Fig. 3.

It may be noted that when in the assembled position, the connecting unit 10 is prevented by the shoulder portion 31 from rotating within the journal end bore 17. This is due to the fact, that for the unit 10 to rotate, the outer arcuately depending ends of the shoulder portion 31 (Fig. 2) would necessarily have to ride up over the peripheral surface of the journal end 18 (Fig. 3), wherein that portion of the shoulder bearing surface 32 aligned longitudinally of the body member 30 with the abutment pin 41, would be longitudinally moved a spaced distance away from the portion of the end journal peripheral surface it previously contacted. As such rotational movement, therefore, would of necessity be accompanied by an upward movement of the body member 30, it is obvious that such lengthwise movement thereof would be prevented by the contacting relation of the abutment pin 41 and the adjacent peripheral surface of the journal end 18. The feature would hold true irrespective of the presence of the diverging arm 13 (Fig. 3) in contacting relation particularly with the laterally extending shoulder portion 31, although obviously this relation would also tend to prevent rotation of the connecting unit.

Although only one embodiment of the present invention has been disclosed, modifications may be made thereto without varying the full scope of the invention as defined in the appended claim.

I claim:

A connecting unit comprising an elongated cylindrical body member having an enlarged head portion at one end thereof, the underside of said portion having an arcuate bearing surface formed about an axis transverse to and extending laterally from said body member, one side of said body member and said head portion being flat and in a single plane parallel to the axis of said body member, a transversely extending bore formed in said body member and spaced longitudinally from said head portion, an abutment pin element movably inserted in said bore for axial movement therethrough, one end of said pin element adjacent said flat side being flat and the other end being rounded, said body member having further a passage formed internally thereof and extending longitudinally therein from the free end, said passage intersecting at its inner end with said bore, a two-legged U-shaped spring element inserted in said passage and having the bight portion thereof placed at the end of said passage opposite the bore end, one leg of said spring element being shorter than the other leg and interlocked with said body member along one side of said passage, and the other leg being retractably forced against the opposite side of said passage and extending into said bore wherein it operatively contacts said pin element to force said rounded end outwardly of the bore.

References Cited in the file of this patent

UNITED STATES PATENTS

| 1,133,164 | McCoy | Mar. 23, 1915 |
| 1,541,093 | Amico | June 9, 1925 |
| 1,759,089 | Black | May 20, 1930 |
| 1,925,174 | Cremean | Sept. 5, 1933 |
| 2,271,500 | Rickenbach | Jan. 27, 1942 |
| 2,721,090 | Kaman | Oct. 18, 1955 |

FOREIGN PATENTS

| 897,178 | Germany | Nov. 19, 1953 |